United States Patent
Jeffries et al.

(10) Patent No.: US 7,360,413 B2
(45) Date of Patent: Apr. 22, 2008

(54) WIRELESS WATER FLOW MONITORING AND LEAK DETECTION SYSTEM, AND METHOD

(75) Inventors: William Worthington Jeffries, Centreville, VA (US); David Wilson Parsons, Oakton, VA (US); Darren Craig Parsons, Falls Church, VA (US)

(73) Assignee: Water Cents, LLC, Oakton, VA (US)

( * ) Notice: Subject to any disclaimer, the term of this patent is extended or adjusted under 35 U.S.C. 154(b) by 12 days.

(21) Appl. No.: 11/318,443

(22) Filed: Dec. 28, 2005

(65) Prior Publication Data

US 2006/0137090 A1    Jun. 29, 2006

Related U.S. Application Data

(60) Provisional application No. 60/639,808, filed on Dec. 29, 2004.

(51) Int. Cl.
*G01F 1/00* (2006.01)
(52) U.S. Cl. ............................................ 73/195; 73/239
(58) Field of Classification Search .................... 73/40, 73/40.5 R, 49.1, 49.5
See application file for complete search history.

(56) References Cited

U.S. PATENT DOCUMENTS

| | | |
|---|---|---|
| 5,056,107 A | 10/1991 | Johnson et al. |
| 5,377,529 A * | 1/1995 | Boyd .............................. 73/40 |
| 5,381,136 A | 1/1995 | Powers et al. |
| 5,432,507 A | 7/1995 | Mussino et al. |
| 5,441,070 A | 8/1995 | Thompson |
| 5,448,230 A | 9/1995 | Schanker et al. |
| 5,553,094 A | 9/1996 | Johnson et al. |
| 5,565,862 A | 10/1996 | Hubbard et al. |
| 5,764,158 A | 6/1998 | Franklin et al. |
| 5,838,258 A | 11/1998 | Saar |
| 5,892,158 A | 4/1999 | Franklin et al. |
| 5,986,573 A | 11/1999 | Franklin et al. |
| 6,161,100 A | 12/2000 | Saar |

(Continued)

OTHER PUBLICATIONS

Buonadaonna et al., Active Message Communication for Tiny Networked Sensors, http://www.tinyos.net/media.html, (date unknown).

*Primary Examiner*—Hezron Williams
*Assistant Examiner*—Paul M West
(74) *Attorney, Agent, or Firm*—Law Office of Peter G. Korytnyk, PLLC (57) ABSTRACT

A wireless water flow monitoring and leak detection system and method are provided. The system includes a base station, a memory, and a central processing unit configured to control the operation of the system and to analyze stored data. A plurality of highly-sensitive wireless flow sensor nodes are each installed individually on a supply line of a water fixture in a facility having a plurality of water fixtures. The wireless flow sensor nodes can periodically read and store a data point corresponding to either a flow condition or a no flow condition occurring at the water fixture. A plurality of coordinator nodes are configured to wirelessly relay data between the plurality of wireless flow sensor nodes and the base station. The base station is configured to determine based on an analysis of the stream of data points whether a leak exists in any of the water fixtures, and if a leak is determined to exist, a maintenance alert is generated.

22 Claims, 3 Drawing Sheets

U.S. PATENT DOCUMENTS

| | | |
|---|---|---|
| 6,351,223 B1 | 2/2002 | DeWeerd et al. |
| 6,377,190 B1 | 4/2002 | Saar |
| 6,543,479 B2 | 4/2003 | Coffey et al. |
| 6,671,636 B2 | 12/2003 | Dawson |
| 6,766,835 B1 | 7/2004 | Fima |
| 6,778,100 B2 * | 8/2004 | Schempf ................ 340/870.07 |
| 6,836,737 B2 | 12/2004 | Petite et al. |
| 6,856,257 B1 | 2/2005 | Van Heteren |
| 6,874,691 B1 | 4/2005 | Hildebrand et al. |
| 6,891,838 B1 | 5/2005 | Petite et al. |
| 6,922,558 B2 | 7/2005 | Delp et al. |
| 6,944,523 B2 | 9/2005 | Addink et al. |
| 7,059,200 B2 * | 6/2006 | Sallee .................... 73/861.88 |
| 2004/0073524 A1 | 4/2004 | Smith et al. |
| 2005/0224118 A1 | 10/2005 | Tornay |
| 2005/0235306 A1 | 10/2005 | Fima |

* cited by examiner

WIRELESS WATER FLOW MONITORING AND LEAK DETECTION SYSTEM, AND METHOD

CROSS-REFERNCE TO RELATED APPLICATIONS

This application claims the benefit under 35 U.S.C. §119 (e) of prior U.S. Provisional Patent Application No. 60/639,808 filed Dec. 29, 2004, which is incorporated in its entirety by reference herein.

FIELD OF THE INVENTION

The present teachings relate to a system and method for the monitoring of water flow in facilities having a plurality of water fixtures. More particularly, the present teachings relate to a system and method for monitoring and identifying leaking water fixtures in large, multi-unit housing complexes utilizing a wireless network of low-power, highly sensitive flow sensor nodes and coordinator nodes that transmit data to a base station for analysis.

BACKGROUND OF THE INVENTION

Preventing wasteful water flow in large facilities having a large number of water fixtures such as apartments, condominiums, and office buildings has dramatic environmental and economic benefits. However, fully maximizing the benefits of water conservation in these environments has been an elusive endeavor.

In the past, condominium and apartment buildings have been constructed in a manner that prevents the economical metering of water supplied to each individual housing unit. Typically, a single water meter is installed in the main line supplying water to these buildings and water usage charges are billed to the condominium association or the apartment owner based on the overall quantity of water consumed as measured by that meter. The water utility expense has been recovered through condominium fees or rents paid by the residents.

Consequently, regardless of the actual quantity of water consumed in each housing unit, the total cost of water service has been shared equally or allocated using a formula based on a pro-rata share of the total living area. In such an arrangement, individual residents do not suffer direct economic penalties for wasteful or inefficient water consumption habits. Nor is there a direct economic reward to individual residents who implement water conservation practices. As a result, leaking water fixtures and generally wasteful consumption habits have tended to develop. The resultant increase in water expenses stresses operating budgets and has encouraged building managers to implement water conservation programs designed to counter this trend.

Known water conservation programs have generally included a combination of the following four elements: 1) installation, if possible, of water meters in each individual unit to provide a means of billing residents directly for the quantity of water consumed in their unit; 2) installation of efficient water fixtures such as water conserving toilets, shower heads, and faucets; 3) educational efforts designed to heighten awareness among residents of the benefits of early detection and repair of leaking water fixtures and the benefits of water conservation habits; and 4) maintenance programs designed to identify and repair or replace leaking water fixtures.

Of the four elements, the installation of water meters has had the most dramatic effect on lowering consumption rates. This has worked by instituting an economic penalty or reward that stimulates improved water consumption habits. The downside of the installation of individual unit water meters is that it has generally been economically feasible only in buildings having a 1:1 relationship between a main feed line and the individual housing unit being metered. Many older buildings are not plumbed in this manner. Instead, water in these older buildings is supplied to each individual housing unit from multiple water lines. As a result, the establishment of a metered billing system requires the installation of multiple water meters in each individual housing unit. Often times, and especially in condominium communities, this has not been economically viable. For example, the following patent documents describe expensive and complicated water monitoring and billing systems that implement water flow meters that measure the quantity of water flowing through a water supply pipe: U.S. Pat. Appl. Pub. No. 2004/0073524 and U.S. Pats. Nos. 5,986,573, 6,161,100, and 6,377,190.

Further, the installation of efficient water fixtures has been found to have a significant initial impact on water consumption levels. However, in the absence of a sustained ongoing maintenance program, seals on new faucets and new toilet valves and other water fixtures deteriorate to the point where the resulting water leakage eclipses the savings achieved by the design features of the new efficient water fixtures.

Lastly, it has been found that while increased water conservation awareness of residents is somewhat helpful, its overall impact is generally recognized as limited. Moreover, the ability to identify leaking water fixtures by residents can be difficult as these leaks are often very subtle or are obscured inside the toilet tanks. Also, quite frequently residents are aware of minor leaks in water fixtures, however the leaks are deemed to be of little significance and therefore go unreported.

Due to the above listed limitations, in multi-unit housing complexes most effective water conservation programs have relied on sustained maintenance programs in which 'Locate and Repair' has been the operating principle. While these programs are simple in concept they can be a challenge to implement effectively. A skilled technician equipped with the proper tools and parts can readily repair leaking water fixtures. However, locating and getting access to faulty fixtures can require an extended effort.

In the absence of reliable reporting by residents, the detection of faulty water fixtures requires periodic, building-wide water fixture inspections by maintenance personnel. This can be a major demand on available maintenance resources and results in inspections being performed only on an annual or semi-annual basis. Consequently, timely detection and repair of leaking water fixtures has not been achieved.

As a result, there continues to exist a need for a low-cost, highly-sensitive system and method for quickly and accurately identifying and reporting leaking water fixtures in facilities having an extensive plumbing network for the distribution of water.

SUMMARY OF THE INVENTION

Accordingly, a wireless water flow monitoring and leak detection system and method are described herein. In one embodiment, the water flow monitoring and leak detection system comprises a base station including a wireless receiver and transmitter, a memory to store data, and a central processing unit configured to control the operation of the system and to analyze stored data. A plurality of wireless flow sensor nodes are each installed on a supply line of a water fixture and at least one of the wireless flow sensor nodes is configured to periodically read and store a data point corresponding to either a flow condition or a no flow condition through the supply line of the water fixture. A plurality of coordinator nodes are each spaced from the supply lines of the water fixtures and are configured to wirelessly relay data between the plurality of wireless flow sensor nodes and the base station. The base station is configured to periodically receive a stream of stored data points from the at least one wireless flow sensor node by way of at least one coordinator node. The base station is configured to determine, based on an analysis of the stream of data points, whether a leak exists in at least one of the water fixtures.

In another embodiment, a method of monitoring water flow and determining leaks comprises intermittently taking a reading from a flow sensor node and storing a data point corresponding to either a flow condition or a no flow condition at a supply line of a water fixture to form a data packet, wirelessly transmitting the data packet to a base station via at least one coordinator node at predetermined time intervals, and analyzing the data packet to determine whether a leak exists in the water fixture.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

Figure 1:
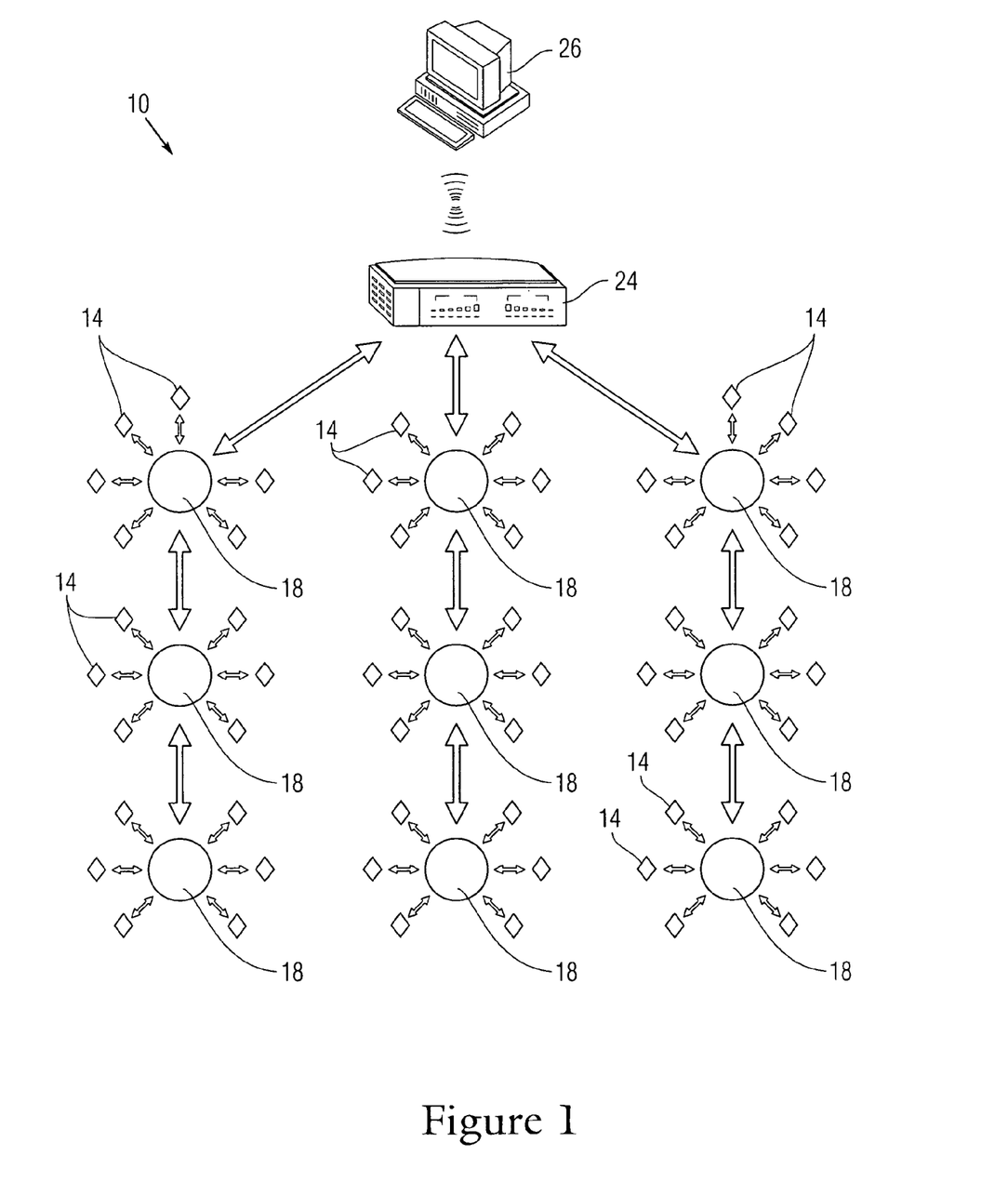
FIG. 1 is a schematic overview of the wireless water flow monitoring and leak detection system according to various embodiments.

Referring to FIG. 1, a wireless water flow monitoring and leak detection system 10 of the present teachings is illustrated. The system 10 can be used in various facilities having a water distribution network including a plurality of water fixtures, such as, for example, multi-unit apartment buildings, condominiums, hospitals, dormitories, commercial office buildings, homes, and the like. In these facilities, water fixtures can include various water using appliances such as sinks, toilets, hot water heaters, clothes washers, bathtubs, and the like.

The system 10 can include a network of highly-sensitive wireless flow sensor nodes 14 that can periodically detect and store data points in memory corresponding to a flow or no flow condition occurring at a particular water fixture. The system 10 can also include a plurality of coordinator nodes 18 for relaying data and commands, and at least one base station computer 24 that can collect, store, and analyze data, as well as transmit commands. A flow sensor node 14 can be installed on or in the vicinity of a supply line of a particular water fixture and can be programmed to periodically detect the flow or no flow conditions at particular time intervals, such as, for example, 15 second intervals. As will be discussed, the data collected at each flow sensor node 14 can be stored in the flow sensor node 14 for transmission as a stream of data points or a data packet. The data packet can be transmitted via a radio frequency (rf) network to the base station 24 at programmable time intervals, such as, for example, every 24 hours. At the base station 24, all received data is stored and analyzed to determine whether any water fixture in the facility is leaking. As will be discussed in detail, a portion of the analysis at the base station 24 includes differentiating between normal flow conditions and a flow condition indicative of a leaking water fixture. If leakage at a specific water fixture is indicated, an alert can be generated and maintenance personnel can be dispatched to repair the faulty fixture. According to various embodiments, the data and/or results of analysis conducted at the base station 24 can be transmitted to an offsite central monitoring computer 26, such as for example, a computer server, via satellite, the internet, telephone lines, and the like. At the off-site location, additional analysis and/or monitoring can be accomplished.

Still referring to FIG. 1, the network architecture of the wireless water flow monitoring and leak detection system 10 will be described. The network can include a plurality, for example, up to and exceeding about 10,000, flow sensor nodes 14. A flow sensor node 14 can be embedded into or in the vicinity of a water fixture, for example, at its water supply line, and can serve to generate a binary signal (or data point) representing a flow or no flow condition occurring at that water fixture. Being installed in the vicinity of the water fixtures, the flow sensor nodes 14 are often times located in areas that are not readily accessible to maintenance personnel. Accordingly, as will be discussed in more detail below, the flow sensor nodes 14 are designed as radio-enabled flow sensors having very low electrical power demands. For example, the flow sensor nodes 14 can have an extended battery life so as to be powered for up to three years by a small battery pack, such as, for example, 2 AA batteries. Moreover, since a constant stream of low volume leakage (i.e. a slow, steady, trickle very slightly in excess of constant drops) occurring at a faucet, for example, can account for approximately 100 gallons of wasted water a day, the flow sensor nodes 14 are designed to be highly-sensitive to water flow. Accordingly, the flow sensor nodes 14 are capable of sensing whether a flow is occurring through a water fixture for flows as low as about ¼ cup a minute.

Coordinator nodes 18 can be located in close proximity to the low-power flow sensor nodes 14 and in readily accessible locations, such that battery replacement in the coordinator nodes 18 can be readily achieved. Coordinator nodes 18 act as repeaters for the entire network. As shown in FIG. 1, each coordinator node 18 can manage a group of flow sensor nodes 14, such as, for example, a group of about 1 to about 255 flow sensor nodes. Each coordinator node 18 can relay data from the base station 24 to its family of flow sensor nodes 14 and, likewise, can relay data from flow sensor nodes 14 back to the base station 24. Each coordinator node 18 can relay data directly between a flow sensor node 14 and the base station 24, or can hop data between other coordinator nodes 18 before reaching a flow sensor node 14 or the base station 24. Individual flow sensor nodes 14 do not communicate with each other.

Figure 2:
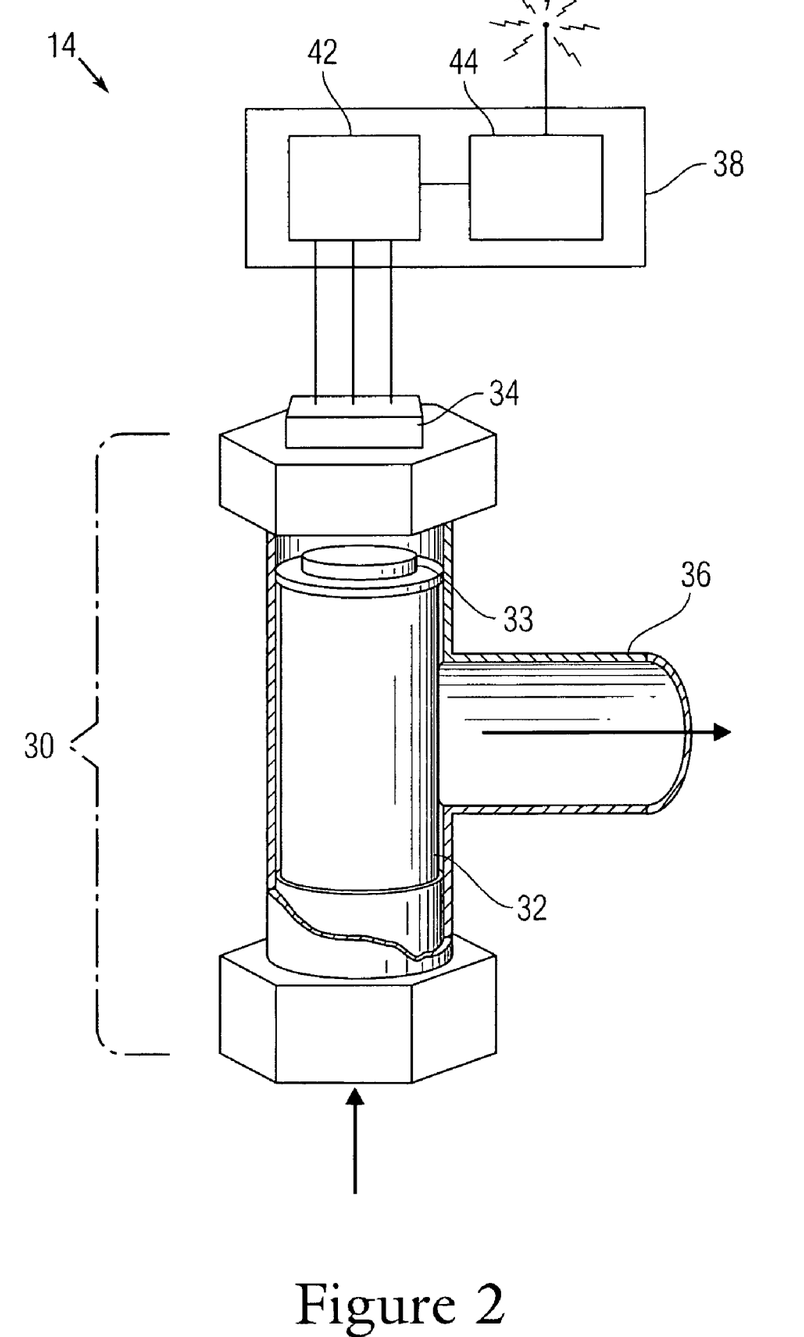
FIG. 2 is a schematic view of a flow sensor node according to various embodiments.

Referring to FIG. 2, a flow sensor node 14 is shown. The flow sensor node 14 can include a flow switch 30, a magnetic sensor 34, and a processor/radio unit 38. The flow switch 30 can include a piston 32 the position of which is dependent on the presence or absence of a fluid flowing through a particular water fixture being monitored. The piston 32 can be arranged to emit a magnetic field, such as, for example, by including a magnet 33 on the piston 32 or by being fabricated from a magnetized material. The housing 36 of the flow switch 30 can be arranged to define a portion of the supply line of the water fixture being monitored. While the flow switch 30 of FIG. 2 is shown as being a right-angle flow connector, it can be arranged in any shape that minimizes flow disturbances in normal water flow conditions yet allows the piston to be responsive at extremely low flow rates, such as, for example, flow rates as low as ¼ cup per minute. A normal water flow rate through the flow sensor node 14 would be about 2 to 3 gallons per minute.

When a fluid flows with a large enough intensity through a flow switch 30, the piston 32 is moved into a position such that its magnetic field is sensed by the low-power sensor 34, which can be, for example, a Hall-effect sensor or a magnetically activated reed switch. In the presence of a magnetic field, the sensor 34 outputs an electrical signal. In the absence of a magnetic field, the sensor 34 does not output an electrical signal. As will be discussed below, the sensor 34 can be polled or queried at programmable time intervals to detect a flow or no flow condition through the water fixture. The sensor 34 can be a Model 3212 Hall-effect sensor produced by Allegro Micro Systems of Worcester, Mass. The output of the sensor 34 can be connected to an analog-to digital (ADC) channel of the processor/radio unit 38 as described below.

The sensor 34 can be connected to a processor/radio unit 38 of the flow sensor node 14. The processor/radio unit 38 operates to sample and collect data from the sensor 34. The processor/radio unit 38 can include various components, such as, for example, a microprocessor 42 and a radio transmitter/receiver 44. The components of the processor/radio unit 38 can be included on one board or on two or more distinct boards in operative contact with each another.

Processor/radio units that are used solely as repeaters constitute the coordinator nodes 18 of the system 10 of the present teachings. The processor/radio units 38 incorporated in the flow sensor nodes 14 and the coordinator nodes 18 of the system 10 of the present teachings can be, for example, MICA2 motes produced by Crossbow Technology, Inc. of San Jose, Calif. Each MICA2 mote can include an analog-to-digital converter (ADC), a Chipcon radio, and an 8-bit microcontroller produced by Atmel Corporation of San Jose, Calif. The sensor 34 of the flow sensor node 14 can be wired to one of the eight channels on the ADC. An operating system used in each processor/radio unit 38 can be TinyOS, initially developed by the University of California, Berkley.

Operational details of the wireless water flow monitoring and leak detection system 10 of tile present teachings will now be described. At particular programmable time intervals, such as, for example, at 15 second time intervals, each flow sensor node 14 can be programmed to poll or query its flow switch 30 by sampling for the presence or absence of an electrical signal on its ADC channel. A data point in the form of a 1 (for flow) or 0 (for no flow) can be stored in a data structure (comprising a stream of data points) in the random access memory (RAM) of processor/radio unit 38. Such an arrangement achieves significant power savings. Since the sensor 34 produces binary data, it is possible to represent the flow data using bits.

To reduce the length of messages sent during data flow transmissions, the water flow monitoring system can employ arithmetic coding data compression at a flow sensor node 14, as described, for example, in D. Hankerson, G. Harris, P. Johnson, *Introduction to Information Theory and Data Compression*, CRC Press LLC, 1998, this publication being incorporated by reference into this disclosure as if fully set forth herein. As most of the bits stored in the data structure can be expected to be 0 (no flow), the use of arithmetic coding can provide about a 25:1 compression ratio. Accordingly, the flow history for a programmable set period of time, such as, for example, an entire day, can be contained in one message or data packet that can be transmitted to the base station 24 from a flow sensor node 14.

The flow sensor nodes 14 can be operated in a power conserving manner by programming the flow sensor node 14 to keep its radio powered off for large periods of time, such as, for example, all but a small window of time each day. A transmission time window can be established by sending a command or message from the base station 24 to a respective flow sensor node 14 which programs the flow sensor node 14 accordingly. During this transmission window, the radio portion of the processor/radio unit 38 is turned on to listen for instructions from a corresponding coordinator node 18. At the appropriate time, the coordinator node 18 can be programmed to request data from the flow sensor node 14. Moreover, in addition to keeping the radio portion of the processor/radio unit 38 turned off, power supplied to the sensor 34 can be programmed to be turned off between each flow data reading period.

Power saving techniques can mean that, for over 95% of the time, the power sink on a flow sensor node 14 would be the timer for a microcontroller on the processor/radio unit 38. Therefore, power consumption for each flow sensor node 14 is designed to be extremely low, for example, about 200 micro-amp hours per day. Power can be supplied by batteries, such as, for example, 2 AA-sized lithium batteries. In the flow sensor nodes 14 of the present teachings, such batteries can provide power for a relatively long life cycle, such as, for example, a 3-year life cycle. Advantageously, the low power consumption requirements of the flow sensor nodes 14 reduces the instances where permission to enter into a unit is required to replace or charge energy cells. Alternatively, the flow sensor nodes 14 can be connected to the electrical grid of the facility.

The network of nodes can be arranged in an rf network having the following characteristics: 1) The network can be static with no movement of nodes; 2) Messages can be sent using Active Messaging (AM) protocol, see for example, P. Buonadaonna, J. Hill, D. Culler, *Active Message Communication for Tiny Networked Sensors*, http://www.tinyos.net/media.html, this document being incorporated by reference into this disclosure as if fully set forth herein; 3) Each flow sensor node can have a 1:1 relationship with its parent coordinator node. That is, a flow sensor node can be arranged to exclusively communicate with its corresponding parent coordinator node in order to conserve power and provide equal power dissipation among the flow sensor nodes; 4) Coordinator nodes can be located in accessible areas and can be programmed to manage a group of flow sensor nodes and to relay all flow data to the base station.

As discussed above, coordinator nodes 18 act as repeaters for the entire network. Each coordinator node 18 can manage a group of flow sensor nodes 14, such as, for example, a group of about 1 to about 255 flow sensor nodes. Coordinator nodes 18 can be a member of two TinyOS Active Message groups: a global coordinator group and a local sensor group. To achieve this, the TinyOS network layer can be modified to accommodate two message groups instead of one. When in receiving mode, a coordinator node 18 can process any message that is sent to the coordinator group or to its sensor group. When transmitting, the coordinator node 18 can dynamically indicate whether the message is being sent to the coordinator group or to its sensor group. Such a dual-group feature is important in meeting network requirements.

Coordinator nodes 18 can be programmed to be placed into in a listening mode in which the power of the radio is set to a maximum value, such as, for example, about 5 db. The coordinator group can be a multi-hop network where each coordinator node has a single parent coordinator node that it can use to communicate back to the base station 24.

Initial configuration of the coordinator nodes 18 can be accomplished through a beacon-based announcement message that can propagate to the furthest coordinator node 18. In this manner, each coordinator node 18 can locate its respective parent. Each coordinator node 18 can broadcast a similar message to its sensor group. These initial discovery messages can also carry time synchronization instructions for programming the system 10 according to user-defined preferences, as will be discussed below.

Flow sensor nodes 14 can be located on the water supply lines for each water fixture. Each flow sensor node 14 can be part of a distinct sensor group with the parent of each group being a coordinator node 18. Flow sensor nodes 14 can be in one of the following states: 1) Listening State: Radio on, timer off, waiting for instructions; 2) Data Collection State: Radio off, timer on, reading flow data from sensor; 3) Transmitting State: Radio on, timer off, sending flow data to coordinator node.

Flow sensor nodes 14 can receive instructions from its parent coordinator node 18. These instructions can inform the flow sensor node 14 of, for example, the identification of its parent (the coordinator), its clock settings, its window for sampling flow data, its window for listening on the network, and when to send collected readings.

Flow sensor nodes 14 can be programmed to transmit at particular time intervals, such as, for example, once a day. Such intermittent transmissions can minimize the power consumption of each flow sensor node 14. The data packet that can be sent from a flow sensor node 14 to a coordinator node 18 (and ultimately to the base station 24 and possibly further to other control centers) can include, for example, the time that readings began, the number of 0's sampled, and the compressed bit stream of flow data. Upon receipt, the base station 24 can send an acknowledgement back to the flow sensor node 14. If the flow sensor node 14 does not receive an acknowledgement during a pre-determined wait period, it can conduct a re-transmission. In the case of a transmission failure after, for example, a third transmission attempt, the flow sensor node 14 can move the compressed data structure from RAM to flash memory, and continue its readings. On subsequent cycles, it can attempt to re-transmit any queued data structures.

The base station 24 for the system 10 can include a Windows-based computer running, for example, WindowsXP or Win2K. However, it is contemplated that other computers and operating systems could be implemented, such as, for example, Macs or PCs running Linux-based, Apple-based, or other Windows-based operating systems. The base station 24 can include a wireless receiver and transmitter, a memory to store data, and a central processing unit configured to control the operation of the system 10 and to analyze stored data.

The base station software can be a NET application that can communicate with a processor/radio unit that is attached to the base station 24 via a serial port. The processor/radio unit of the base station 24 can run a modified TOSBase application that can coordinate all radio messages between the base station and the network.

Figure 3:
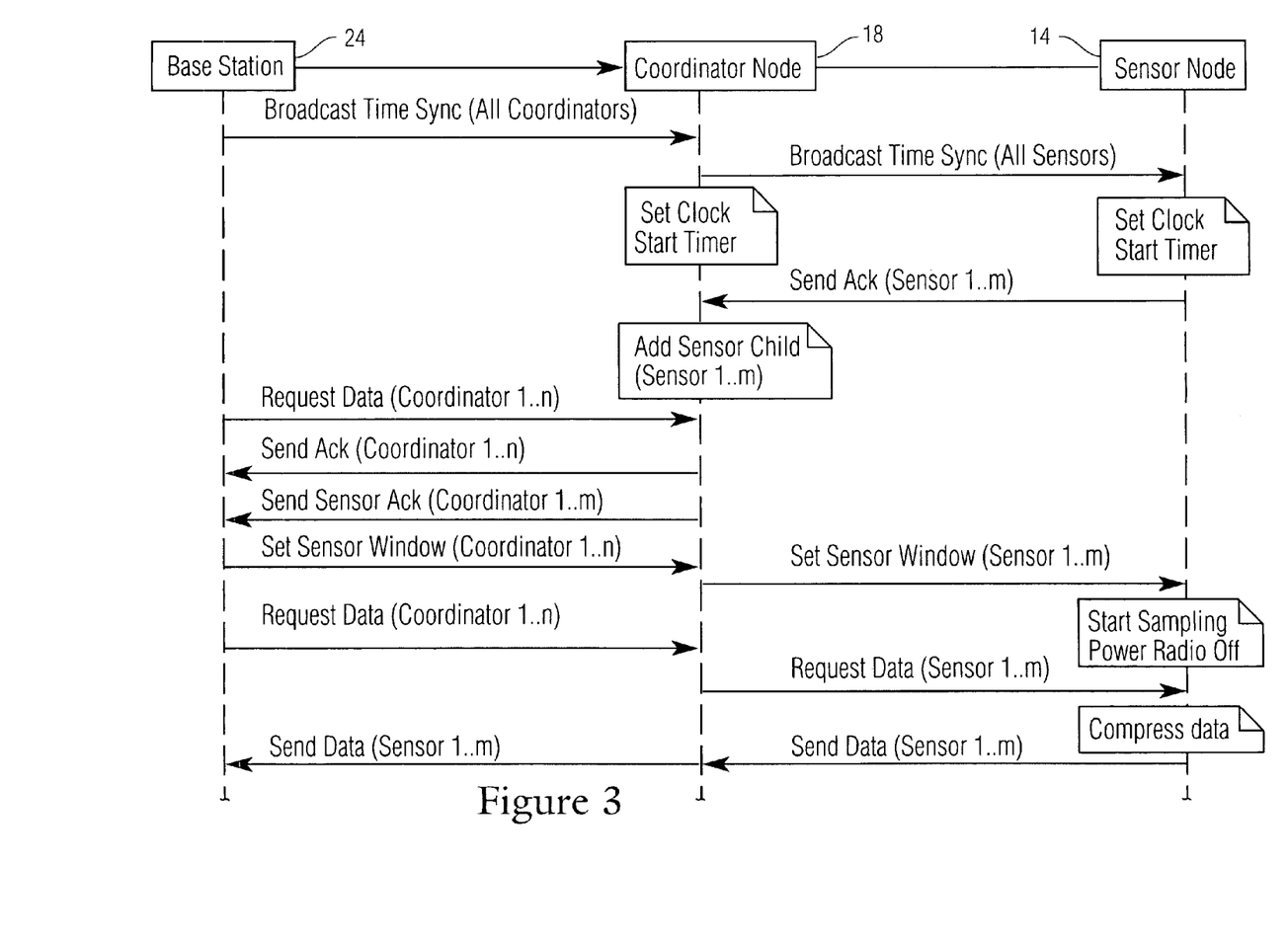
FIG. 3 shows an overview of system coordination and data flow between elements of the wireless water flow monitoring and leak detection system according to various embodiments.

A Graphical User Interface (GUI) can be used to, for example:

Send commands to the coordinator nodes:
(1) Synchronization command (network and time)
(2) Start Data Collection command
(3) Request Data command
View the network configuration:
(4) Location of coordinator nodes
(5) Location of flow sensor nodes
Analyze data from each water fixture being monitored and determine if the data indicates:
(6) water flow due to normal usage
(7) water flow due to leakage FIG. 3 illustrates the coordination and data flow between the base station 24, coordinator nodes 18, and the sensor nodes 14 that can be achieved by way of software run by the base station 24 of the system 10 according to various embodiments. Time, network position, and polling coordination can originate at the base station 24. The base station 24 can first send a broadcast message to, for example, one or more coordinator nodes 18. This message can be propagated through the coordinator multi-hop network. The broadcast message can instruct the coordinator nodes 18 to, for example, synchronize themselves in the network, set their clocks, and identify their path to the base station 24. After receiving the broadcast message, the coordinator nodes 18 can send an acknowledgement (Ack) back to the base station 24 revealing their location in the network.

The base station 24 can instruct one or more coordinator nodes 18 to broadcast a synchronization message to its corresponding flow sensor group. Individual flow sensor nodes 14 can use this command to initialize themselves, such as, for example, set their clocks and identify the corresponding coordinator node 18 as their parent. Flow sensor nodes 14 can send an acknowledgement (Ack) message back to the coordinator nodes 18 which the coordinator nodes 18 can re-transmit to the base station 24.

To program data collection, the base station 24 can transmit a command to each coordinator node 18 that can include instructions for that coordinator node's sensor group corresponding to, for example, the time intervals for taking readings at the flow sensor nodes 14 (i.e. the sampling window) and the time intervals for sending data packets back to the coordinator node 18 (i.e. transmission window). This command is then relayed to each flow sensor node 14 by the coordinator node 18.

Coordination of data packet transmissions from the flow sensor nodes 14 can be scheduled. The base station 24 can run a master schedule for querying each flow sensor node 14. For example, the base station 24 can transmit a message to a specific coordinator node 18 and that coordinator node can then sequentially request data from each of its flow sensor nodes 14. This systematic process can reduce data packet collision on the network and can make the base station 24 immediately aware of any flow sensor node 14 that might be having trouble transmitting its data packet. The base station 24 can transmit an acknowledgement to each flow sensor node 14 after successfully processing a data packet.

By uncompressing the data packet coming in from each flow sensor node 14, the base station software can reconstruct water flow characteristics in the facility for a given unit of time, such as, for example, a day, for every unit in the facility. From this data, the base station 24 can identify numerous conditions, such as, for example, faulty toilet valves, periodically cycling valves, sluggish valves, valves exhibiting constant flow, and the like.

Data can be stored in a database in the memory of the base station 24. Queries can be performed on the data to search for obvious patterns of abnormalities. However, with the massive amount of data being collected, identifying specific water events for each unit in the facility can be complex. For example, the system 10 can report at least the following water flow events for each unit: 1) Normal irregular water flow—irregular flow resulting from the normal daily water demands from various water fixtures; 2) Periodic water flow—a characteristic of cycling toilet valves; and 3) Constant water flow—a characteristic of water fixture leakage.

A reporting mechanism can be included in the base station software and can be built around genetic algorithms (GA), as described, for example, in Melanie Mitchell, *An Introduction to Genetic Algorithm*, MIT Press, 2001, this publication being incorporated by reference into this disclosure as if fully set forth herein. The GAs are arranged to enable machine learning in order to efficiently and accurately detect various water problems. According to various embodiments, the principal components of such a technique can include the following: a set of input variables, a mechanism for setting an output decision, and a feedback system for tuning the mechanism.

The set of input variables for the GA reporting system can be, for example, the total number of 1's in the data stream, the longest strand of 1's in the data stream, and the number of times the longest strand appears in the data stream. The actual GA can look at these input variables and make a decision as to whether or not the data indicates normal water flow, cycling toilet, a leak, and other water flow conditions.

For any input that is determined to be an abnormal water flow condition, a message displayed at the base station 24 can instruct a maintenance person to investigate the particular unit in the facility. After investigation, the maintenance person can enter and record at the base station 24 whether or not this event was in fact an irregular water event. This process represents the feedback feature of the system. After recording the event, the GA system can update its internal model and can thereby "teach" itself how to identify various water patterns.

Eventually, once the GA system has achieved a certain level of consistent success in identifying water flow events, the processing of algorithms can be programmed and performed at the flow sensor nodes 14 themselves. In this manner, the flow sensor node 14 can be arranged to transmit sampling data only when a faulty fixture has been detected.

In addition to monitoring the flow state of individual water fixtures, the wireless network architecture of the system 10 can also be used to monitor operational characteristics of other systems used in facilities. The wireless network architecture can be arranged to monitor the battery state of devices, such as, for example, smoke detectors and emergency exit signs used in various buildings. According to various embodiments, sensors including a battery voltage meter can be mated with a processor/radio unit and arranged on each device to be monitored, such as a smoke detector or emergency exit sign. As discussed above with respect to water flow monitoring, the base station software can enable periodic collection of data, such as, for example, battery status data, from each monitored device in the facility. When appropriate, a maintenance alert can be generated at the base station 24 specifying the location of a device having a failing battery.

The system and method of the present teachings provide a low-cost, automated system that can reliably identify and report the status of flow through water fixtures found in various facilities. The network of low-cost, low-power wireless flow sensor nodes, coordinator nodes, and the base station computer of the present teachings provide an efficient and economical way of continuously monitoring and reporting leaks in water fixtures thereby preventing wasteful water flow in water distribution networks. In a relatively short period of time, the costs of system implementation and maintenance of the network of the present teachings would be offset by savings in water costs.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A wireless water flow monitoring and leak detection system comprising:
    a base station including a wireless receiver and transmitter, a memory to store data, and a central processing unit configured to control the operation of the system and to analyze stored data;
    a plurality of wireless flow sensor nodes each being installed on a supply line of a water fixture, at least one of the wireless flow sensor nodes being configured to periodically read and store a data point corresponding to either a flow condition or a no flow condition through the supply line of the water fixture; and
    a plurality of coordinator nodes each being spaced from the supply lines of the water fixtures and configured to wirelessly relay data between the plurality of wireless flow sensor nodes and the base station;
    wherein the base station is configured to periodically receive a stream of stored data points from the at least one wireless flow sensor node by way of at least one coordinator node and to determine based on an analysis of the stream of data points whether a leak exists in at least one of the water fixtures;
    wherein the at least one wireless flow sensor node is configured to store a data point corresponding to a flow condition when the flow through the supply line of the respective water fixture is about ¼ cup a minute and larger.

2. The wireless water fixture flow monitoring and leak detection system of claim 1, wherein the plurality of wireless flow sensor nodes and the plurality of coordinator nodes are configured in a network arrangement in a multi-unit building whereby at least one of the plurality of coordinator nodes is arranged in a readily user-accessible location and in radio contact with at least one flow sensor node.

3. The wireless water flow monitoring and leak detection system of claim 1, wherein the at least one wireless flow sensor node includes a programmable processor/radio unit configured to store and transmit the data points back to the base station.

4. The wireless water flow monitoring and leak detection system of claim 3, wherein the programmable processor/radio unit of the at least one wireless flow sensor node is programmable from the base station to control at least one of the interval of time between data point readings and the interval of time between transmissions back to the base station.

5. The wireless water flow monitoring and leak detection system of claim 3, wherein the programmable processor/radio unit is capable of being programmed to be powered off between data point readings.

6. The wireless water flow monitoring and leak detection system of claim 3, wherein the programmable processor/radio unit is capable of being programmed to be powered off between data point transmissions.

7. The wireless water fixture leak detection system of claim 1, wherein each of the water fixtures comprises one of a faucet, sink, toilet, hot water heater, clothes washer, and bathtub.

8. A wireless water flow monitoring and leak detection system comprising:
   a base station including a wireless receiver and transmitter, a memory to store data, and a central processing unit configured to control the operation of the system and to analyze stored data;
   a plurality of wireless flow sensor nodes each being installed on a supply line of a water fixture, at least one of the wireless flow sensor nodes being configured to periodically read and store a data point corresponding to either a flow condition or a no flow condition through the supply line of the water fixture; and
   a plurality of coordinator nodes each being spaced from the supply lines of the water fixtures and configured to wirelessly relay data between the plurality of wireless flow sensor nodes and the base station;
   wherein the base station is configured to periodically receive a stream of stored data points from the at least one wireless flow sensor node by way of at least one coordinator node and to determine based on an analysis of the stream of data points whether a leak exists in at least one of the water fixtures;
   wherein the at least one wireless flow sensor node includes a piston arranged to reciprocate in a cylinder in response to water flow through the supply line of the water fixture.

9. The wireless water flow monitoring and leak detection system of claim 8, wherein the at least one wireless flow sensor node includes a sensor that outputs an electronic signal when the piston moves within a set distance from the sensor.

10. The wireless water flow monitoring and leak detection system of claim 9, wherein the at least one wireless flow sensor node includes a programmable processor/radio unit that is configured to sample and store electronic signals from the sensor as data points.

11. A leak detection system comprising:
   a base station including a wireless receiver and transmitter, a memory to store data, and a central processing unit;
   a plurality of wireless flow sensor nodes each capable of being installed on a supply line of a water fixture, at least one of the wireless flow sensor nodes being programmable to periodically read and store a data point corresponding to either a flow condition or a no flow condition through the supply line of the water fixture; and
   a plurality of coordinator nodes each being capable of wirelessly relaying data between the plurality of wireless flow sensor nodes and the base station;
   wherein the base station computer is capable of periodically receiving a stream of stored data points from the plurality of wireless flow sensor nodes by way of at least one coordinator node and determining whether a leak exists in any of the water fixtures based on an analysis of the stream of data points;
   wherein the at least one wireless flow sensor node includes a piston arranged to reciprocate in a cylinder.

12. The leak detection system of claim 11, wherein the at least one wireless flow sensor node includes a sensor that outputs an electronic signal when the piston moves within a set distance from the sensor.

13. The leak detection system of claim 12, wherein the piston is arranged to move within the set distance from the sensor when a flow of water through the flow sensor node is as low as about ¼ cup a minute.

14. The wireless water fixture leak detection system of claim 11, wherein each of the water fixtures comprises one of a faucet, sink, toilet, hot water heater, clothes washer, and bathtub.

15. A method of monitoring water flow and determining leaks comprising:
   intermittently taking a reading from a flow sensor node and storing a data point corresponding to either a flow condition or a no flow condition at a supply line of a water fixture to form a data packet;
   wirelessly transmitting the data packet to a base station via at least one coordinator node at predetermined time intervals; and
   analyzing the data packet to determine whether a leak exists in the water fixture;
   wherein intermittently taking a reading and storing a data point corresponding to either a flow condition or a no flow condition includes sensing whether a piston has moved within a distance from a sensor.

16. The method of claim 15, wherein intermittently taking a reading and storing a data point corresponding to a flow condition includes sensing a flow through the supply line of the water fixture of about ¼ cup per minute and larger.

17. The method of claim 15, further comprising switching off electrical power to a portion of the flow sensor node in between intermittently taking a reading and storing a data point corresponding to either a flow condition or a no flow condition.

18. The method of claim 15, further comprising wirelessly transmitting commands from the base station to the flow sensor node to control the interval of time between data point readings.

19. The method of claim 15, wherein intermittently taking a reading and storing a corresponding data point occurs at the supply lines of a plurality of water fixtures and forms a plurality of data streams.

20. A wireless water fixture leak detection system comprising:
   a water fixture to be monitored comprising one of a faucet, sink, toilet, hot water heater, clothes washer, and bathtub;
   a water supply line arranged to supply water to the water fixture to be monitored;
   a wireless flow sensor node arranged on the water supply line of the water fixture to be monitored and in the vicinity of the water fixture, the wireless flow sensor node including a flow switch, a sensor, and a processor/radio unit, the wireless flow sensor node being configured to periodically read and store a binary signal corresponding to either a flow condition or a no flow condition through the water supply line of the water fixture to be monitored, the processor/radio unit of the wireless flow sensor node being capable of wirelessly transmitting stored binary signals; and a base station configured to periodically receive the stored binary signals transmitted by the wireless flow sensor node and determine based on an analysis of the binary signals whether a leak exists in the water fixture to be monitored.

21. The wireless water fixture leak detection system of claim 20, wherein the flow switch of the wireless flow sensor node includes a housing that defines a portion of the water supply line.

22. A low-power, wireless water fixture leak detection system comprising:

a water fixture comprising one of a faucet, sink, toilet, hot water heater, clothes washer, and bathtub;

a water supply line arranged to supply water to the water fixture;

a battery-powered, wireless flow sensor node arranged on the water supply line of the water fixture and in the vicinity of the water fixture, the wireless flow sensor node including a flow switch, a sensor, and a processor/radio unit, the wireless flow sensor node being programmable to periodically read and store a binary signal corresponding to either a flow condition or a no flow condition through the water supply line of the water fixture, the processor/radio unit of the wireless flow sensor node capable of wirelessly transmitting stored binary signals and being remotely programmed to be powered off for periods of time; and a base station configured to periodically receive the stored binary signals from the wireless flow sensor node and determine based on an analysis of the transmitted binary signals whether a leak exists in the water fixture.

* * * * *